July 21, 1931. P. B. CAMP 1,815,235
BRAKE MECHANISM
Filed Dec. 6, 1926 4 Sheets-Sheet 1
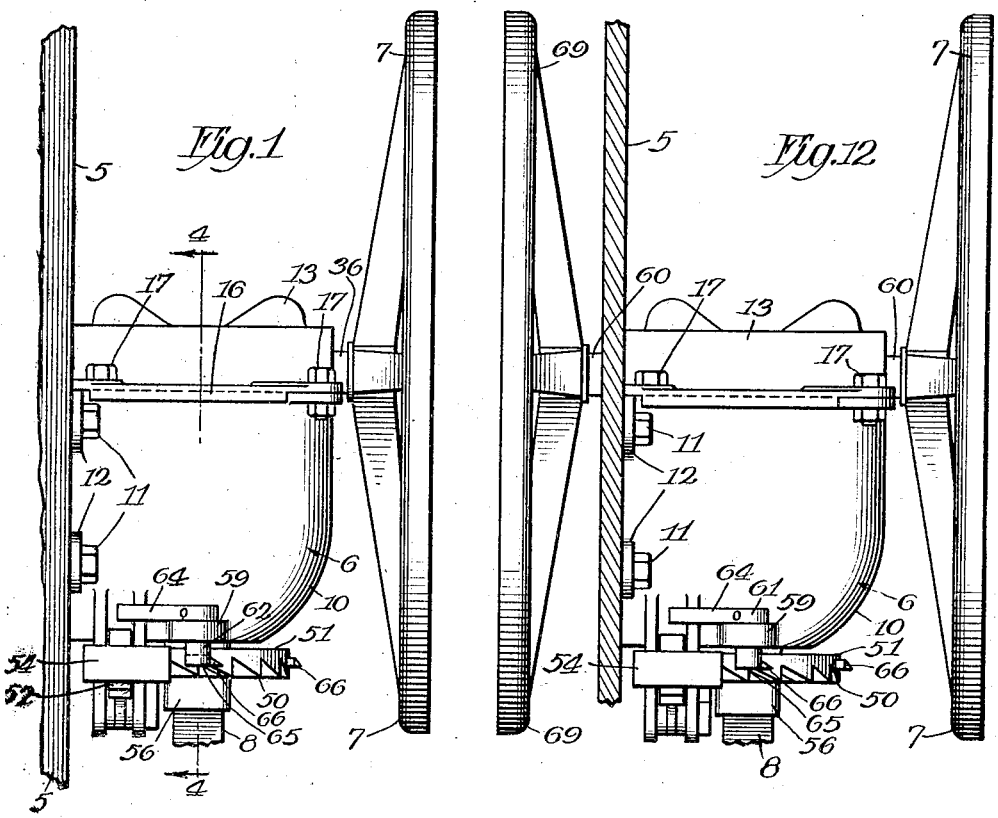
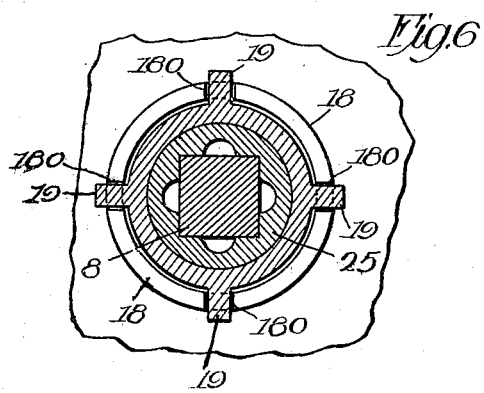
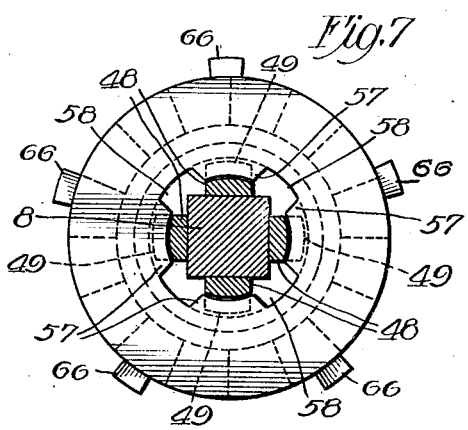
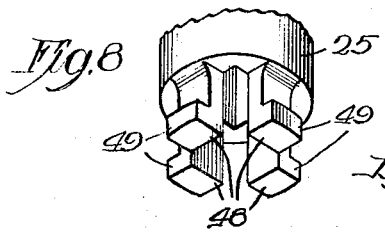
Inventor:
Percy B. Camp
By Gillson, Mann & Cox
Attys.

Inventor
Percy B. Camp
By Gillson, Mann Hoxie Attys.

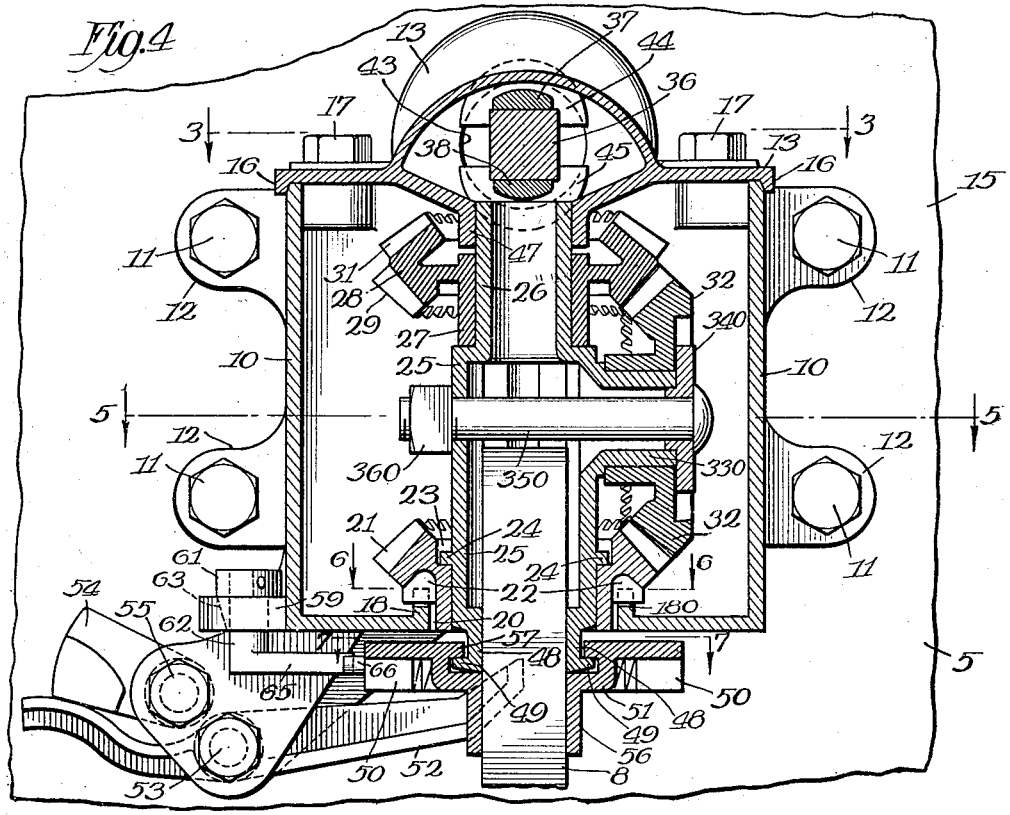
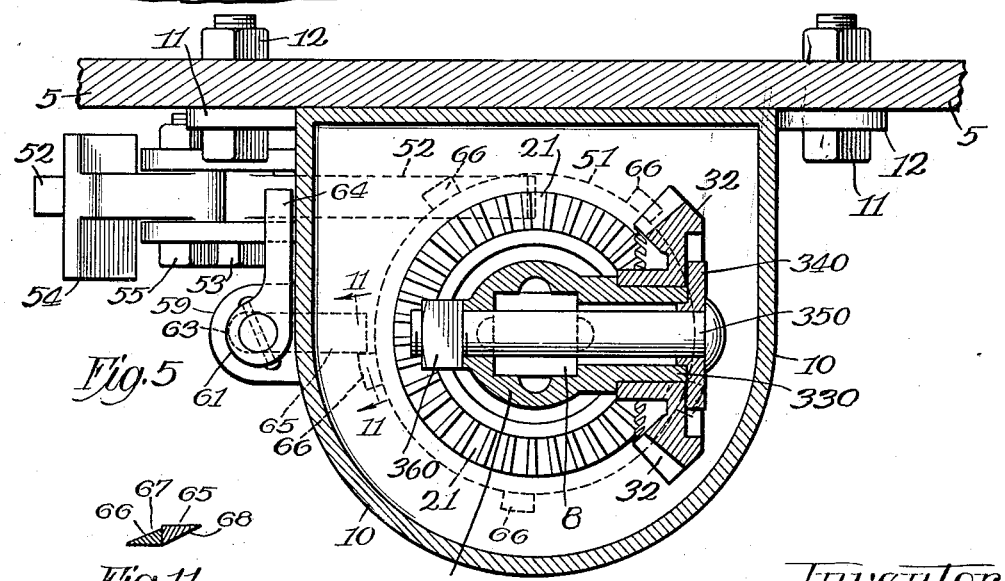

July 21, 1931.  P. B. CAMP  1,815,235
BRAKE MECHANISM
Filed Dec. 6, 1926  4 Sheets-Sheet 4

Inventor:
Percy B. Camp
By Gillson, Mann & Cox Attys.

Patented July 21, 1931

1,815,235

UNITED STATES PATENT OFFICE

PERCY B. CAMP, OF MAYWOOD, ILLINOIS

BRAKE MECHANISM

Application filed December 6, 1926. Serial No. 152,764.

This invention relates to railway brakes and more particularly to manually operated mechanism for applying the brakes.

One of the objects of the invention is the provision of a sectional brake staff having new and improved differential mechanism interposed between the sections of the shaft whereby the two sections will move at different speeds for multiplying the power during the application of the brakes.

Another object of the invention is the provision of new and improved means for mounting the gears of the differential mechanism employed between the sections of the brake staff.

A further object of the invention is the provision of a new and improved differential brake mechanism that is equally as applicable to blind baggage as to passenger or freight cars.

Another object of the invention is the provision of a new and improved operating mechanism for railway brakes that is cheap to manufacture, simple in construction, easily assembled, efficient in operation, and one that is composed of a minimum number of moving parts.

Other and further objects and advantages of the invention will appear from the following description taken in connection with the drawings in which—

Fig. 1 is the side elevation of a portion of one end of a railway car showing the invention in position thereon, with parts broken away.

Fig. 4 is a vertical section on line of 4—4 of Fig. 1.

Fig. 5 is a section on line of 5—5 of Fig. 4.

Fig. 6 is a section on line of 6—6 of Fig. 4.

Fig. 7 is a section on line of 7—7 of Fig 4.

Fig. 8 is a perspective view of the lower end of bearing sleeve with parts broken away.

Fig. 11 is a section on line 11—11 of Fig. 5 showing the arm of the tripping lever and a co-operating projection on the bevel gear.

Fig. 12 is a view similar to that shown on Fig. 1, but showing a modified form of the device.

Figure 2:
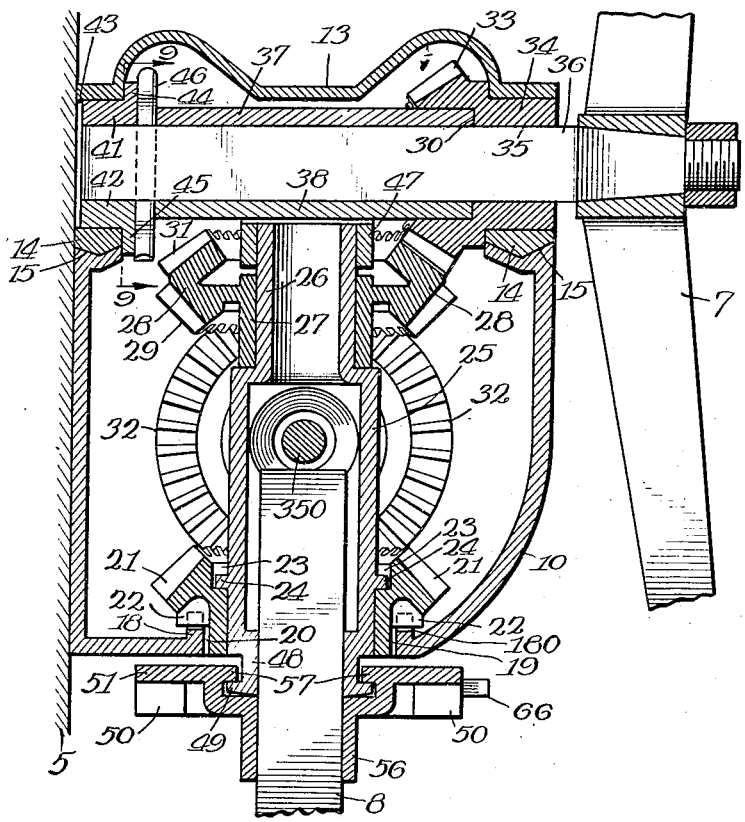
Fig. 2 is the longitudinal vertical section of the same.

Referring now to the drawings in which the same reference characters designate the same parts throughout the description the reference character 5 designates the blind or non-vestibule end of a railway car on which is mounted the brake operating mechanism 6, comprising the hand wheel or lever 7, the brake staff 8, and differential gear mechanism interposed between said wheel and staff for rotating the latter.

The differential gear mechanism will now be described. The mechanism comprises the casing 10 which is adapted to be attached to the end of the car in any suitable manner as by bolts 11 extending through flanges 12 on said casing.

The casing 10 is provided with closure as the cap 13. The front and rear end of the cap 13 may, if desired, be provided with V shaped projections 14, which are adapted to interlock or co-operate with corresponding grooves 15 on the upper portion of the casing 10 as clearly shown in Fig. 2 of the drawings.

The sides of the cap 13 are preferably, though not necessarily, provided with depending flanges 16, see Fig. 4, which are adapted to engage the outer surfaces of the upper end of the casing 10 to prevent lateral movement of said cap. The cap is held on the casing in any suitable manner as by means of bolts 17.

The lower end of the casing 10 is provided with an opening 20 about which is an upstanding flange 18 for receiving the hub 19 of a bevel gear 21. The hub 19 is provided with radially extending ribs or projections 22, which are adapted to engage the notches 180 for preventing the rotation of said gear.

The gear 21 is provided at its upper end with a counterbore 23 for receiving annular flange 24 on a bearing sleeve 25 for preventing the vertical movement of said gear. The sleeve 25 constitutes what may be termed, a portion of the brake staff 8. The upper end of the sleeve 25 is reduced as at 26 to form a bearing for the hub 27 of the gear 28. The gear 28 may be termed a double beveled gear since the same is provided with a gear 29 on one beveled edge and a gear 31 on another beveled edge. The teeth of the gear 29 are adapted to mesh with a gear 32 journalled on a radially extending hub 330 carried by said sleeve. The gear 32 is held on the hub in any suitable manner. In the form shown, a retaining disc 340 held against the outer end of the gear by a bolt 350 extending through said sleeve and having a nut 360 on the end thereof is employed for this purpose. The gear 32 meshes with the gear 21 in the lower end of the casing and is adapted to travel around the same as will presently appear.

The gear 31 meshes with gear 33 carried by the cap 13, said gear 33 being provided with a hub 34 journalled in the outer end of said cap. The hub 34 is provided with an angular opening 35 through which the operating shaft 36 is adapted to extend. The shaft 36, sleeve 25 and shaft 8 may be considered a sectional brake staff. The operating wheel or lever 7 is rigidly mounted on the outer end of the shaft 36. The gear 33 is held in assembled position by means of the positioning bars 37 and 38. The positioning bars 37 and 38 are provided at their outer ends with bearing members 41 and 42, which together form a journal for engaging in an opening 43, in the inner end of the cap or closure 13. The positioning bars 37 and 38 are provided with flanges 44 and 45 respectively, which will prevent the removal of said bars when the parts are assembled.

The inner ends of bars 37 and 38 are adapted to engage the counter-bore 30 in the gear 33 for preventing inward movement of the gear.

Figure 9:
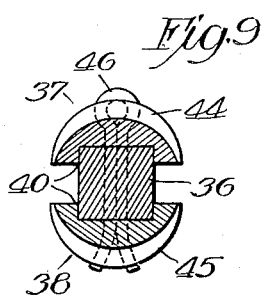
Fig. 9 is a section on line of 9—9 of Fig. 2.
Figure 3:
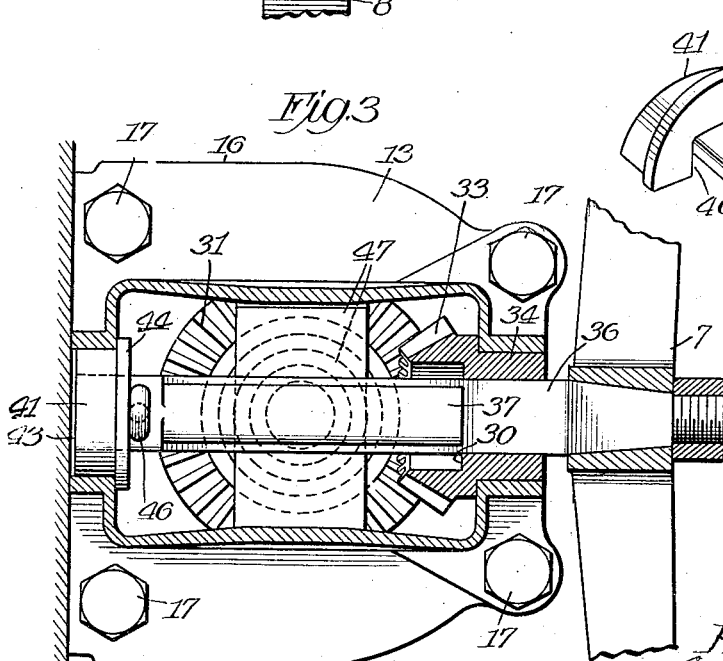
Fig. 3 is a section on line 3—3 of Figure 4.
Figure 10:
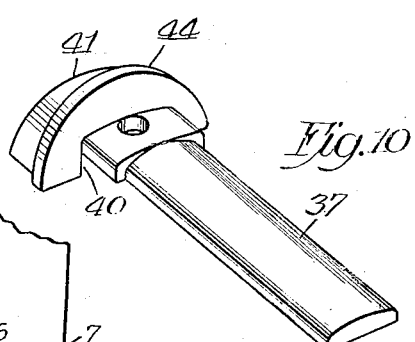
Fig. 10 is a perspective view of the spacer members.

The shaft 36 is angular in cross section as clearly shown in Fig. 9 and the bearing members 41 and 42 are provided with angular recesses 40 for engaging said shaft. These spacing bars are positioned on opposite sides of the operating shaft and are held in assembled position in any suitable manner as by means of a key 46 which extends through said members and the operating shaft 36.

The upper end of the sleeve bearing 25 is held in operative position by means of a depending sleeve 47 which is rigidly secured to said cap or closure 13 as by being integral therewith, and constitutes what may be termed the upper bearing for the brake staff. The lower end of the sleeve 25 is journalled in the hub of the gear 21, which constitutes what may be termed the intermediate bearing for the brake staff, and is provided with a plurality of depending projections 48, see Fig. 8, each of which has a flange 49 extending outward radially of said sleeve. The lower end of the sleeve is provided with an angular-bore in which the upper end of the angular brake staff 8, is adapted to engage.

A suitable pawl and ratchet mechanism is provided for holding the brake staff in adjusted position in applying the brakes. As shown a ratchet wheel 51 and a co-operating pawl 52 are employed for this purpose, see Fig. 4. The ratchet wheel 51 has its teeth 50 on the underside thereof, which are adapted to be engaged by pawl 52 pivoted as at 53. The pawl is adapted to be held in engagement with the teeth by a weight member 54, pivoted as at 55. When the weight is turned to the position shown in Fig. 4, the pawl 52 will engage the teeth. When it is turned upwardly, the weight of the inner end of the pawl will cause the pawl to drop out of engagement with the ratchet teeth.

The ratchet wheel is held in assembled position by the staff 8 and flanges 49 on the lower extension 48 of the sleeve 25, as will now be described. The ratchet is provided with a hub 56 having an angular bore through which, the angular brake staff 8 extends. The ratchet is also provided with inwardly extending projections 57, see Figs. 7 and 8, spaced from the hub 56 and separated from each other to provide notches 58 through which the flanges 49 may be passed when the parts are assembled. In assembling the device, the ratchet wheel is turned to the position where the notches 58 are in alinement with the flanges 49 which are then raised to cause the flanges 49 to pass through the notches 58, after which the ratchet is turned so that the flanges 49 engage beneath the projections 57, see Fig. 7. The angular openings through the sleeve 25 and ratchet wheel are now in alinement and the shaft 8 is slid upwardly through said openings. The shaft 8 will prevent the rotation of the ratchet wheel, relative to the sleeve and consequently the parts will be held in assembled relation.

The operating shaft 36, the gear 33, and the spacing members 37 and 38 are assembled in the following manner:

Gear 33 is first placed in position in the cap or closure 13. The spacer members 37 and 38 are then inserted through the opening 43 in the cap 13, until their inner ends engage in the counter-bore 30 in the hub 34. The shaft 36 is now inserted through the angular opening 35 in the hub 34 of the gear 33, and between the spacer members 37 and 38, after which the key 46 is inserted through the spacer members and the operating shaft 36.

In assembling the gears in the casing 10, the gear 21 is first placed in position and the sleeve 25, after the gear 32 has been mounted thereon, is placed in position with its lower end extending through the gear 21, and with the gear 32 in mesh with the gear 21. The double bevel gear 28 is placed in position on the sleeve bearing 26 and the cap 13 is then placed in position with the upper end of the member 25 engaging in the positioning sleeve 47, and with the gear 33 meshing with the gear 31.

It is common practice, to employ a manually controlled means for holding the brake staff in adjusted position, in applying the brakes. When the brakes are applied, it is necessary in the conventional type, to either manually move the holding device to operative position, or to shift a weight for this purpose. But such an arrangement is objectionable and likely to result in serious consequences, especially in emergencies, as when in excitement, the operator neglects to throw the weight or move the pawl to operative position. The present invention contemplates the use of means that is automatically operated by the movement of the mechanism in the direction to apply the brakes, for holding the brake staff in adjusted position.

The form of the device disclosed is by way of example only, and is adapted to automatically move a weight to cause a pawl to engage the teeth of a ratchet wheel carried by the brake staff. The parts are so constructed that the reverse or releasing movement of the ratchet will not affect the weight operating member. In the form of the device disclosed on the drawing, see Figs. 4 and 5, a lug 59, on the casing 10 having a latch member 61 pivoted therein, is employed for this purpose. The latch 61 comprises the body portion 62 rotatably mounted in the vertical opening 63 extending through said lug 59. An arm 64 is secured to the upper end of the body portion, and is adapted to engage the weight 54. The lower end of the body portion is provided with an arm 65, which is adapted to be engaged by projections 66 extending radially from the periphery of the ratchet wheel. The lugs 66 are preferably triangular in the form as shown in Figs. 1 and 11, and the arm 65 is also triangular in form whereby, when the ratchet wheel turns in reverse direction, that is, in the direction to release the brakes, the incline 67 of the lugs 66 will engage the corresponding incline 68 on the arm 65, and the lug 66 will slide beneath the arm 65 without affecting the arm 64. Upon turning the brake staff 8, and the ratchet wheel 51 in the opposite direction, that is, in the direction to apply the brakes, the vertical side of the triangular lug 66 will engage the vertical side of the arm 65 and will turn said arm, thereby causing the arm 64 to move outwardly from the casing 10, to throw the weight 54 to the position shown in Fig. 4 of the drawings, to cause the pawl 52 to engage the teeth of the ratchet wheel.

In the operation of the device, when it is desired to apply the brakes, the lever or wheel 7 and shaft 36 are rotated, thus rotating gear 33, which will in turn cause the rotation of the gear 32 through the gears 31 and 29. The gear 32 will thereby be caused to travel around the gear 21, locked to the casing 10, carrying with it the bearing sleeve 25, ratchet wheel 51, and the brake staff 8 for winding up the brake chain for applying the brakes.

The rotation of the ratchet wheel 51 will bring one of the lugs 66 into engagement with the arm 65 to turn the arm 64, for shifting the weight 54, to cause the pawl 52 to engage the teeth on the ratchet wheel 51, for holding the brake in adjusted position. The differential movement of the gears will considerably multiply the power applied to the wheel or arm 7 thereby, applying the brakes with considerable force. The mechanical advantage may be changed as desired by changing the gear ratio of the mechanism.

In the construction of power multiplying brakes, especially those of the geared type, it is essential that the gears be held in proper adjustment in order that the mechanism may operate smoothly and efficiently. In applying the brakes, the tension of the brake chain will tend to bend the brake staff 8, and consequently if the bearing at the lower end of the sleeve 25 be rigidly held in position, there would be binding and considerable friction developed in rotating the shaft. In order to eliminate this binding action, the opening 20 is slightly enlarged in order to permit the gear 21, to have a limited radial movement, see Figs. 2 and 4. This movement is limited, but it is sufficient to compensate for the bending of the brake staff in applying the brakes. In the present construction, the gear 33 is held in position by the spacer members 37 and 38, and the gears 31, and 32, are held in position by the sleeve member 25, which in turn is securely held in vertical position by the sleeve 47, on the closure 13, thus insuring the proper alining and positioning of the different gears, whereby they operate with a minimum amount of friction.

The modified form of the device shown in Fig. 12 differs from that shown in Fig. 1, in that the operating shaft 60 is extended inwardly through the end 5 of the car and is provided with an additional lever or operating wheel 69, whereby the brakes may be applied from either the inside of the car by the wheel, or lever 69, and from the outside of the car by the wheel or lever 7.

Figure 13:
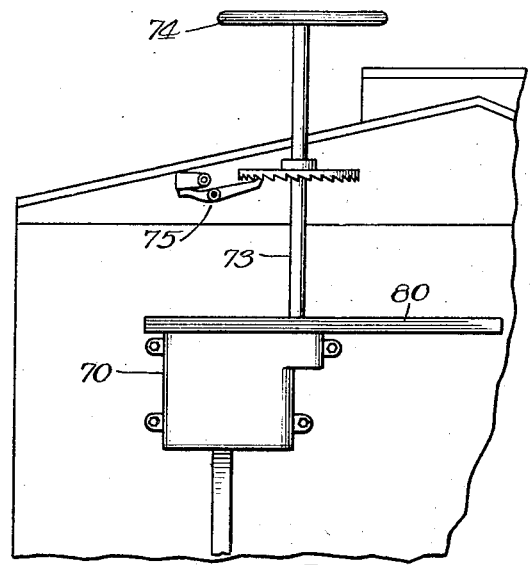
Fig. 13 is the end elevation of a portion of a railway car showing a further modified form of the invention, in position thereon.
Figure 14:
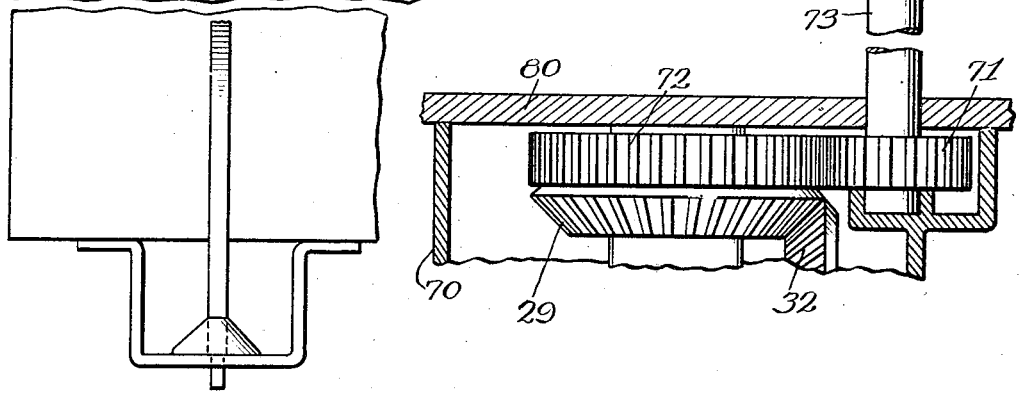
Fig. 14 is a vertical section of the upper portion of the gear casing of the construction shown in Fig. 13 with parts broken away.

In Figs. 13 and 14 is shown a further modified form of the device whereby, the same is adapted to be employed on freight cars and other constructions, in which it is desirable or necessary that the operating staff be in a vertical position. This form of construction differs from that shown in Fig. 2, in that the gears 33 and 31 are changed to spur gears 71 and 72, respectively. The gear 71 is mounted on the lower end of the operating shaft 73, the upper end of which is provided with the usual lever or wheel 74, for operating the brake. A suitable pawl and ratchet mechanism 75 is employed for holding the brake in adjusted position.

The casing 70 is located immediately below the standing platform 80 whereby, said platform protects said casing from dust, cinders, rain, snow, and the like.

Figure 15:
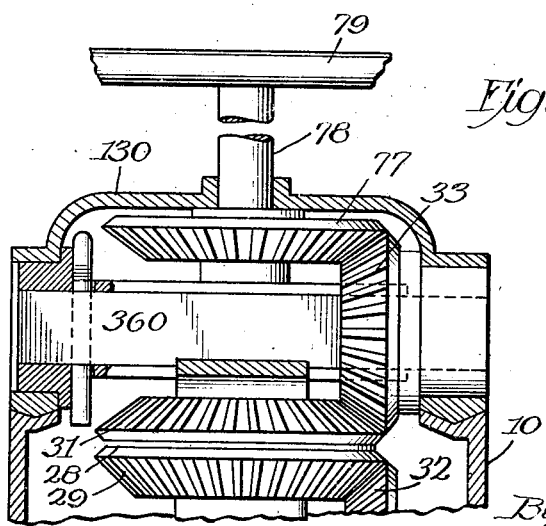
Fig. 15 is a similar view with modified form of construction shown in Figs. 13 and 14.

In Fig. 15 is shown a still further modified form of construction. This device differs from that shown in Fig. 2 in that an additional beveled gear 77 is mounted on the lower end of the operating shaft 78, the upper end of which is provided with the usual operating lever or wheel 79. In this form of construction the cap 130 is modified to accommodate the additional gear 77, and the shaft 360 which corresponds to the shaft 36 in Fig. 2, is not extended outwardly beyond the casing to receive the wheel 7, as in the construction previously described.

Since the remaining portion of the operating mechanisms are substantially the same as shown in Fig. 2, it is not thought necessary to repeat the description of these parts.

It is thought from the foregoing taken in connection with the accompanying drawings that the construction and operation of my device will be apparent to those skilled in the art, and that various changes in size, shape, proportion, and details of construction may be made without departing from the spirit and scope of the appended claims.

I claim as my invention:

1. In combination, a railway car, a sectional brake staff at one end of said car exteriorally thereof, a fixed gear, a stub shaft on the upper section of said brake staff, a gear rotatably mounted on said shaft and meshing with said first-named gear, an operating shaft extending across said staff at right angles thereto, and gear mechanism between said last-named shaft and said second-named gear.

2. In combination, a railway car, a casing attached to said car, a brake staff rotatably mounted in said casing, a gear fixed to said casing, a hub on said staff, a gear journaled on said hub and meshing with said first-named gear, an operating shaft extending transversely to said brake staff, and gear mechanism between said operating shaft and said second-named gear for rotating the latter for operating said brake staff.

3. In a brake operating mechanism, a casing, a closure for said casing, an operating shaft journalled in said closure, a gear on said shaft, a lever for rotating said gear and shaft, a gear mounted in the lower end of said casing and provided with an axial bore, a sleeve member journalled in said bore, a brake staff interlocked with said sleeve member, a laterally extending journal on said sleeve, a gear rotatably mounted on said journal and intermeshing with said second named gear, and a double gear journalled on the upper end of said sleeve member and having teeth intermeshing with the teeth of said first and last named gears.

4. In a brake operating mechanism, a casing open at one end, a removable closure for said opening, a brake staff associated with said casing, differential gear mechanism within said casing for operating said staff, a plurality of bearings carried by said closure and removable therewith, an operating shaft journaled in said bearings and removable with said closure and extending transversely to said brake staff, means on said shaft for operating said gears, and means for securing said closure to said casing.

5. In a railway brake operating mechanism provided with a casing, a closure for said casing, said closure having alined openings therein, a downwardly extending projection having an opening therein for forming a bearing, a gear having a hub journaled in one of said openings and provided with an angular opening extending axially therethrough, an angular shaft extending through said last named opening and one of said first named openings, a plurality of spacer members engaging said shaft and each provided with a segmental flanged journal member for engaging in one of said first named openings, the inner ends of said spacer members engaging said gear for preventing the same from becoming disengaged from said closure, and means for connecting said spacer members to said shaft for preventing the longitudinal movement of said shaft.

6. As an article of manufacture, a spacing member comprising a body portion having a flat side, a head member on one end of said body portion, said head member comprising a radially extending flange and a curved portion adjacent thereto for forming a bearing, said head member being provided with an angular recess opposite to said curved surface.

7. In a brake operating mechanism, a brake staff angular in cross-section at its upper end, an operating lever, means including a sleeve member for rotating said staff from said lever, said sleeve member being provided with a plurality of retaining members spaced apart and provided with outwardly extending flanges, a ratchet wheel, inwardly extending lugs on said ratchet wheel, said lugs being spaced apart to form notches through which said flanges may extend when said wheel is applied, said wheel being provided with an angular axial opening which is adapted to aline with a corresponding opening in said sleeve to receive said staff for holding said flanges beneath said lugs, to support said wheel.

8. In a brake mechanism, a casing, a closure for said casing, interlocking connection between said casing and closure, an operating shaft carried by said closure, a gear mounted on said shaft and journalled in said closure, means including spacing members for holding said gear and shaft in position within said closure, a brake staff and means operated by said gear for rotating said shaft.

9. In a brake operating mechanism, a casing, an upwardly extending notched flange in the lower portion of said casing, a gear having ribs engaging said notches for preventing the rotation of said gear relatively to said casing, said gear being provided with a bore extending axially therethrough, a brake shaft extending through said bore, an operating shaft extending transversely to said brake shaft, and means cooperating with said gear and operated by said operating shaft for rotating said brake shaft.

10. In a brake operating mechanism comprising a closure for a casing, said closure having alined bearings through its walls, an operating shaft extending through said bearings, a gear mounted on said shaft and having its hub journalled in one of said bearings, a plurality of spacing members having their outer ends forming a journal for said shaft, and their inner ends engaging said gear for preventing inward movement of the same.

11. In a brake mechanism, a brake operating means, an upper bearing for said means, an intermediate bearing for said means, and a support for said intermediate bearing, said support having a limited radial movement.

In testimony whereof I affix my signature.

PERCY B. CAMP.